(12) United States Patent
Hamblet

(10) Patent No.: US 11,190,933 B2
(45) Date of Patent: Nov. 30, 2021

(54) ESIM MANAGEMENT PLATFORM CONFIGURED TO BE POLLED BY AN ESIM CARD

(71) Applicant: Teal Communications, Inc., Bellevue, WA (US)

(72) Inventor: Robert Martin Hamblet, Sammamish, WA (US)

(73) Assignee: TEAL COMMUNICATIONS, INC., Bellevue, WA (US)

( * ) Notice: Subject to any disclaimer, the term of this patent is extended or adjusted under 35 U.S.C. 154(b) by 372 days.

(21) Appl. No.: 16/265,708

(22) Filed: Feb. 1, 2019

(65) Prior Publication Data

US 2020/0252791 A1    Aug. 6, 2020

(51) Int. Cl.
| | |
|---|---|
| *H04W 12/42* | (2021.01) |
| *H04W 12/03* | (2021.01) |
| *H04W 8/18*  | (2009.01) |
| *H04B 1/3816* | (2015.01) |
| *H04W 12/50* | (2021.01) |

(52) U.S. Cl.
CPC .......... *H04W 12/03* (2021.01); *H04B 1/3816* (2013.01); *H04W 8/18* (2013.01); *H04W 12/42* (2021.01); *H04W 12/50* (2021.01)

(58) Field of Classification Search
CPC ...... H04W 12/03; H04W 12/04; H04W 12/42
See application file for complete search history.

(56) References Cited

U.S. PATENT DOCUMENTS

| | | |
|---|---|---|
| 10,659,954 B2 | 5/2020 | Hamblet |
| 2013/0217361 A1 | 8/2013 | Mohammed et al. |
| 2014/0031012 A1 | 1/2014 | Park et al. |
| 2014/0349617 A1 | 11/2014 | Li et al. |
| 2017/0127264 A1* | 5/2017 | Yang ................... H04L 63/0428 |

(Continued)

FOREIGN PATENT DOCUMENTS

| | | |
|---|---|---|
| CN | 106899540 | 6/2017 |
| CN | 107979835 | 5/2018 |

(Continued)

OTHER PUBLICATIONS

Search Opinion, dated Jul. 31, 2020, received in Danish Patent Application No. PA 2020 70061.

*Primary Examiner* — Michael T Vu

(74) *Attorney, Agent, or Firm* — Davis Wright Tremaine LLP; George C. Rondeau, Jr.; Heather M. Colburn

(57) ABSTRACT

A computer-implemented method that includes receiving, by an embedded subscriber identity module ("eSIM") management platform, a channel request from an eSIM card. In response to the channel request, the platform opens an encrypted data channel and downloads the information to the eSIM card over the encrypted data channel only when the platform has information to download to the eSIM card. Optionally, before the platform receives the channel request, the platform receives a status request from the eSIM card that does not request that the platform open the encrypted data channel, and sends a response to the eSIM card that is positive only when the platform has information to download to the eSIM card, the eSIM card sending the channel request only when the response is positive. The channel request or the status request, when present, originating from the eSIM card and having been triggered by a timer.

23 Claims, 8 Drawing Sheets

(56) References Cited

U.S. PATENT DOCUMENTS

| | | | |
|---|---|---|---|
| 2017/0142121 A1 | 5/2017 | Lee et al. | |
| 2018/0352425 A1* | 12/2018 | Vasudevan | H04W 8/18 |
| 2018/0376325 A1 | 12/2018 | Xu et al. | |
| 2019/0037335 A1 | 1/2019 | Steck | |
| 2019/0058989 A1 | 2/2019 | Park et al. | |
| 2019/0104401 A1 | 4/2019 | Park et al. | |

FOREIGN PATENT DOCUMENTS

| | | |
|---|---|---|
| CN | 108848496 | 11/2018 |
| CN | 109257740 | 1/2019 |
| KR | 20160061846 | 6/2016 |
| WO | 2013/169484 | 11/2013 |

\* cited by examiner

ESIM MANAGEMENT PLATFORM CONFIGURED TO BE POLLED BY AN ESIM CARD

BACKGROUND OF THE INVENTION

Field of the Invention

The present invention is directed generally to systems and methods for provisioning and maintaining cellular services on mobile devices and, more particularly, to systems and methods for providing cellular services to mobile devices that include embedded subscriber identity module ("eSIM") cards.

Description of the Related Art

Communicating some types of information over a cellular network to a cellular enabled device requires an encrypted data channel. Unfortunately, opening an encrypted data channel is expensive because it requires a specialized Hardware Security Module. To limit the opening of an encrypted data channel to only when one is needed, an eSIM platform typically waits until it has something to download to the cellular enabled device, and then pushes an unsecure SMS request to the cellular enabled device, or, waits for the device to initiate the channel request itself. The cellular enabled device responds to the SMS with a channel request that initiates the opening of the encrypted data channel, or, initiates the channel request itself at a timed interval. Unfortunately, the cellular enabled device cannot determine whether the eSIM platform has something to download to the cellular enabled device without either receiving an unsecure SMS message, or first sending the channel request and opening an expensive encrypted data channel.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
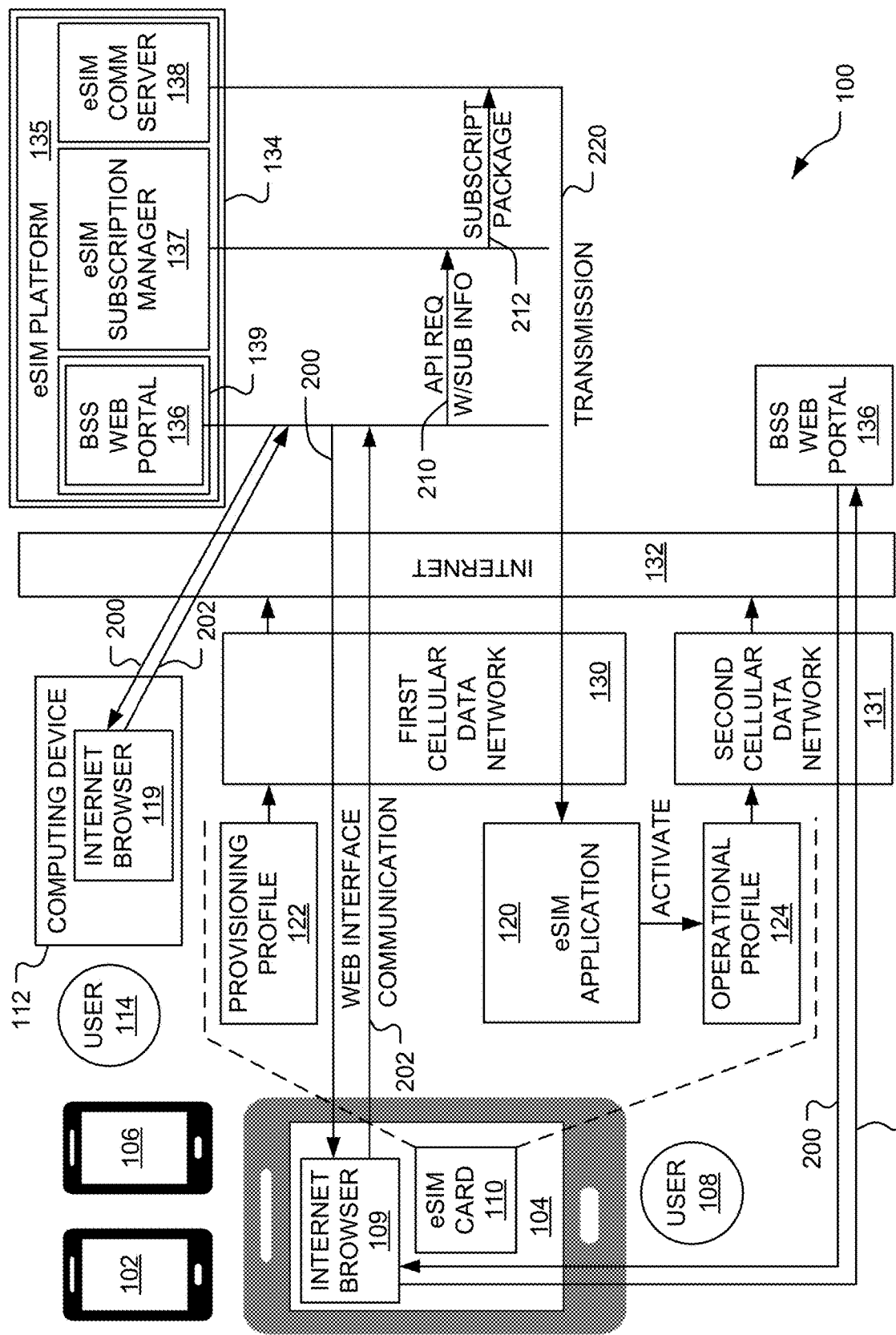
FIG. 1 is a functional block diagram of a subscription management system configured to manage cellular services provided to a plurality of cellular enabled devices that each include an embedded subscriber identity module ("eSIM") card.

FIG. 1 is a functional block diagram of a subscription management system 100 configured to manage cellular services provided to cellular enabled devices 102-106 that each include an embedded subscriber identity module ("eSIM") card 110. By way of a non-limiting example, at least some of the cellular enabled devices 102-106 may each be implemented as a mobile communication device 300 illustrated in FIG. 9. By way of another non-limiting example, referring to FIG. 1, at least some of the cellular enabled devices 102-106 may each be implemented as devices (e.g., vehicles) configured for machine-to-machine ("M2M") communication and/or to communicate on the Internet of Things ("IoT"). For ease of illustration, FIG. 1 includes only the three cellular enabled devices 102-106. However, the system 100 may include any number of devices each like the device 104. Also, for ease of illustration, the device 104 has been illustrated as being operated by a user 108. By way of a non-limiting example, the user 108 may manage operations of the eSIM cards installed in one or more of the cellular enabled devices 102-106. The device 104 may be configured to execute an Internet browser 109 or similar communication application.

Figure 8:
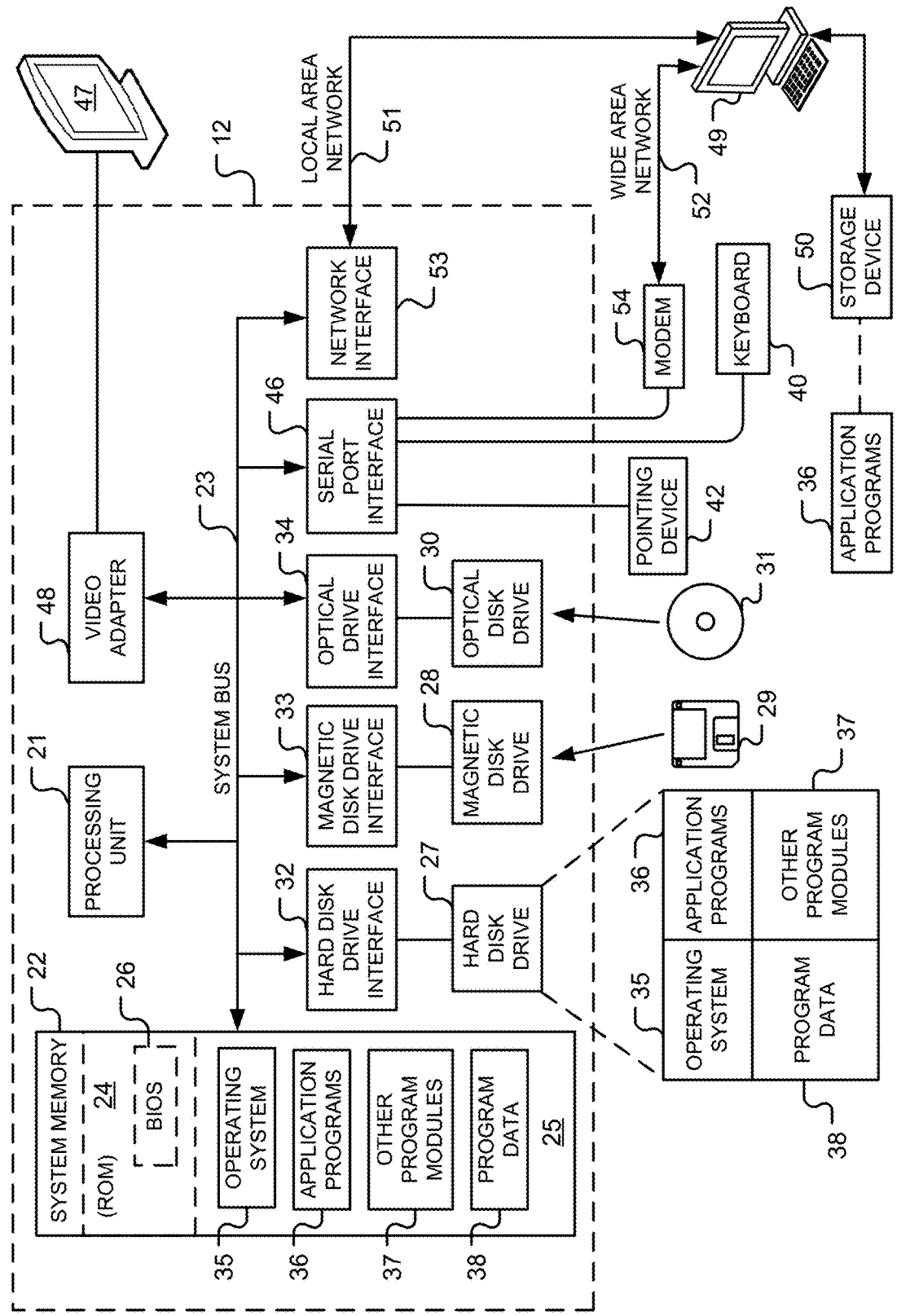
FIG. 8 is a diagram of a hardware environment and an operating environment in which the computing devices of the system of FIG. 1 may be implemented.

Optionally, the system 100 may include a computing device 112 (e.g., like a computing device 12 illustrated in FIG. 8). An Internet browser 119 or similar communication application may be installed on and executed by the computing device 112. The Internet browser 119 may be operated by the user 108 and used to manage operations of the eSIM cards installed in one or more of the cellular enabled devices 102-106. Alternatively, the Internet browser 119 may be operated by another user 114 who may manage the operations of eSIM cards installed in one or more of the cellular enabled devices 102-106. For example, the user 114 may be in charge of the operations of one or more of the cellular enabled devices 102-106.

By way of non-limiting examples, the eSIM card 110 may be implemented as an embedded chip (e.g., soldered on a board), a plastic card (e.g., inserted into the device 104), and the like. Alternatively, the functionality of the eSIM card 110 described below may be integrated into silicon. For example, the eSIM card 110 may be implemented as an iSIM, a universal integrated circuit card ("UICC"), an embedded UICC ("eUICC"), a processor (e.g., a central processing unit 310 illustrated in FIG. 9), and/or memory (e.g., memory 312 illustrated in FIG. 9) of the device 104. The eSIM card 110 is configured to be updated wirelessly with one or more different operator profiles. In contrast, traditional SIM cards store only a single operator profile that cannot be changed. Additionally, traditional SIM cards are designed to be removable (e.g., by the user 108). In contrast, the device 104 and/or the eSIM card 110 may be configured to prevent the removal of the eSIM card 110 from the device 104 by the user 108.

The eSIM card 110 includes an eSIM application 120, a provisioning profile 122, and/or one or more operational profiles. For ease of illustration, the eSIM card 110 will be described as including only an operational profile 124 (after the operational profile 124 is received from an eSIM subscription manager 137). However, the eSIM card 110 may store any number of operational profiles. The provisioning profile 122 includes one or more applications configured to access a first cellular data network 130 and any network credentials required by the first cellular data network 130 to use the first cellular data network 130, such as a provisioning International Mobile Subscriber Identity ("IMSI"). The provisioning profile 122 may be characterized as being a default profile that is usable by the eSIM card 110 to communicate over the first cellular data network 130. The operational profile 124 includes one or more applications configured to access a second cellular data network 131 and any network credentials required by the second cellular data network 131 to use the second cellular data network 131, such as an operational IMSI. The first and second cellular data networks 130 and 131 may be the same network or different networks. The first and second cellular data networks 130 and 131 may operate in the same country or in different countries. The first and second cellular data networks 130 and 131 are connected to the Internet 132.

The system 100 includes one or more entities 134 that operate an eSIM platform 135 that includes a Business Support System ("BSS") self-service or web portal 136, the eSIM subscription manager 137, and an eSIM communication server 138. The BSS web portal 136, the eSIM subscription manager 137, and the eSIM communication server 138 may each be implemented by one or more computing devices (e.g., each like the computing device 12 illustrated in FIG. 8). By way of a non-limiting example, the BSS web portal 136, the eSIM subscription manager 137, and the eSIM communication server 138 may each be implemented as a different computing device. In the embodiment illustrated, the BSS web portal 136 has been implemented by a web server 139. In FIGS. 4-7, the eSIM subscription manager 137 is illustrated as being implemented by an eSIM management server or platform 404.

By way of a non-limiting example, referring to FIG. 1, the eSIM subscription manager 137 may be implemented using software sold by IDEMIA (e.g., M-Connect Subscription Manager software), NordicESIM, Gemalto, HOP, Morpho, a wireless carrier, or other eSIM subscription or platform provider.

By way of non-limiting examples, the eSIM communication server 138 may be implemented as a short message service center ("SMSC") configured to communicate with the eSIM application 120 via Short Message Service ("SMS") messages, a Hypertext Transfer Protocol ("HTTP") server configured to communicate with the eSIM application 120 via HTTP messages, and the like. Thus, during a profile download operation, the operational profile 124 may be transmitted to the eSIM application 120 via an SMS message, HTTP message, and the like.

As mentioned above, the device 104 may communicate over the first cellular data network 130 using the provisioning profile 122 on the eSIM card 110. However, the user 108 or the user 114 may wish to make changes to the eSIM card 110. Such changes will be referred to as eSIM card operations. For example, the user 108 or the user 114 may wish to download the operational profile 124, which is configured to use the second cellular data network 131, instead of the first cellular data network 130. Such an eSIM card operation will be referred to as a profile download operation. U.S. patent application Ser. No. 15/975,443, filed on May 9, 2018, and titled eSIM Subscription Management System, describes methods of performing a profile download operation. U.S. patent application Ser. No. 15/975,443 is incorporated herein by reference in its entirety.

When the profile download operation is performed, after the eSIM card 110 receives the operational profile 124, the eSIM application 120 completes the profile download operation by activating the operational profile 124 (e.g., marking the operational profile 124 as active within the eSIM card 110), which configures the eSIM card 110 to use the operational profile 124 to communicate over the second cellular data network 131 in accordance with a subscription type or service plan selected by the user 108 or the user 114. After the operational profile 124 is activated within the eSIM card 110, the user 108 may communicate with the BSS web portal 136 over the Internet 132 using the Internet browser 109, the operational profile 124, and the second cellular data network 131. Alternatively, the user 108 may communicate with the BSS web portal 136 over the Internet 132 using the Internet browser 109, the provisioning profile 122, and the first cellular data network 130. Additionally, the user 108 or the user 114 may communicate with the BSS web portal 136 over the Internet 132 using the computing device 112 and the Internet browser 119.

Referring to FIG. 1, the BSS web portal 136 generates a web interface 200 so that functions provided by the BSS web portal 136 may be used remotely by those using the web interface 200 (e.g., via the Internet browser 109 or the Internet browser 119). The Internet browser 109 or the Internet browser 119 are each configured to display the web interface 200 to the user 108 or the user 114. The web interface 200 may be implemented as a dashboard configured to manage one or more of the devices 102-106. By way of a non-limiting example, the web interface 200 may be implemented as a Self-Service web portal of the type normally used to make changes to a user account or collect payments from the user 108. The web interface 200 may be customized to include branding associated with the one or more entities 134.

Figure 2:
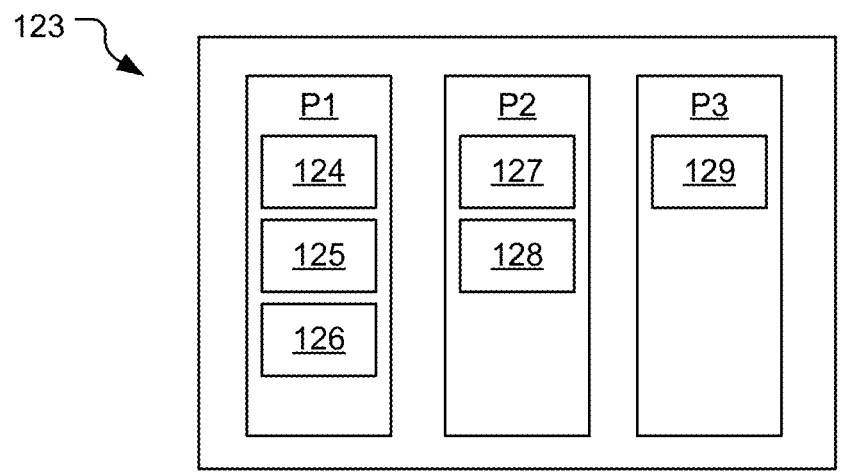
FIG. 2 is a block diagram illustrating an inventory of pre-activated cellular service plans each associated with one or more operational profiles that is stored or accessible by an eSIM subscription manager.

Referring to FIG. 2, the eSIM subscription manager 137 (see FIG. 1) stores or has access to an inventory 123 of pre-activated cellular service plans P1-P3 each associated with one or more operational profiles 124-129 (e.g., each like the operational profile 124). For ease of illustration, the inventory 123 illustrated in FIG. 2 includes only the three cellular service plans P1-P3 and the six operational profiles 124-129. However, the inventory 123 may include any number of service plans and any number of operational profiles. In the example illustrated, the operational profiles 124-126 are each associated with the service plan P1, the operational profiles 127 and 128 are each associated with the service plan P2, and the operational profile 129 is associated with the service plan P3.

Figure 3:
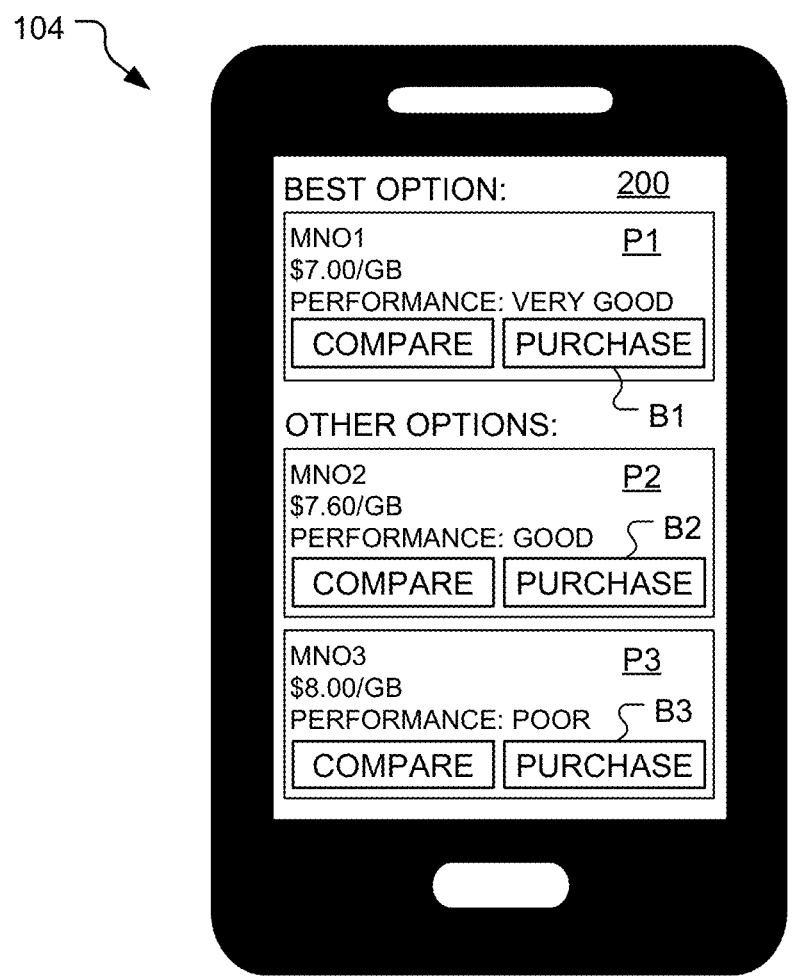
FIG. 3 is an exemplary web interface generated by a BSS web portal and displayed to a user.

The BSS web portal 136 may be characterized as implementing a dynamic marketplace that allows the user 108, the user 113, or machine operators on the IoT to select from the available service plans (e.g., in a plurality of countries) using the web interface 200. For example, the service plans P1-P3 (see FIGS. 2 and 3) may include generic Internet access on a specific network, special Internet access using a service plan tailored to a branded service partner, and the like. The web interface 200 may display available network rates side-by-side for different MNOs. Referring to FIG. 3, optionally, the web interface 200 may be configured to sort and/or rank the service plans P1-P3 (e.g., by cost, performance, quality of service, etc.). In the example illustrated, the service plans P1-P3 have been ranked by cost.

In the embodiment illustrated, the service plans P1-P3 are associated with selectable buttons B1-B3, respectively, displayed by the web interface 200. The user 108 (see FIG. 1) or the user 114 (see FIG. 1) may select one of the service plans P1-P3 by selecting the button associate with the service plan. For ease of illustration, the user 108 or the user 114 may select the button B1 associated with the service plan P1.

The web interface 200 may also be configured to display one or more selectable eSIM card operations (not shown) other than the profile download operation. Non-limiting examples of eSIM card operations include: auditing, updating, or removing the operational profile 124 or the provisional profile 122. Additional non-limiting examples include installing an application on the eSIM card 110 as well as auditing, updating, or removing an application installed on the eSIM card 110. By way of another non-limiting example, the eSIM card operations may include changing an application's settings and/or parameters (e.g., an applet timer value change). Further, the eSIM card operations may include application behavior changes (e.g., upgrades, updates, and the like).

While the eSIM subscription manager 137 and the eSIM communication server 138 will be described as being accessed via the BSS web portal 136, the user 108 and/or the user 114 may perform an eSIM card operation by bypassing the BSS web portal 136 and directly accessing the eSIM subscription manager 137 or the eSIM communication server 138. The eSIM subscription manager 137 or the eSIM communication server 138 may be directly accessed using a command line interface or a separate web server (not shown). The web server (not shown) may be configured to generate a web interface (not shown) that the user 108 and/or the user 114 may use to select one of the eSIM card operations and enter any information (e.g., parameters) needed to perform the selected eSIM card operation.

As mentioned above, referring to FIG. 1, the user 108 or the user 114 may use the web interface 200 to select one of the eSIM card operations. For ease of illustration, the user 108 will be described as using the Internet browser 109 to display the web interface 200 and using the web interface 200 to request a profile download operation and to select one of the pre-activated service plans P1-P3 (see FIGS. 2 and 3). However, the user 108 could use the Internet browser 119 to perform these functions or the user 114 could use the Internet browser 119 to perform these functions. In this example, the user 108 uses the Internet browser 109 to access the BSS web portal 136, which generates the web interface 200. The user 108 initiates the profile download operation by selecting one of the service plans P1-P3 (e.g., the service plan P1) illustrated in FIGS. 2 and 3 using the web interface 200. Returning to FIG. 1, after the user 108 enters the selection, the Internet browser 109 sends a communication 202 with the selection across the Internet 132 to the BSS web portal 136.

After the BSS web portal 136 receives the communication 202, the BSS web portal 136 sends a request 210 to the eSIM subscription manager 137. The request 210 identifies the selection and includes subscriber information (e.g., the information included in the provisioning profile 122). By way of a non-limiting example, the request 210 may include one or more of the following:
an identifier of the eSIM card 110, such as an integrated circuit card identifier ("ICCID"), electronic identity ("EID"), and the like;
at least a portion of the provisioning profile 122, such as the provisioning IMSI; and/or
a profile identifier.

When the user 108 has selected a profile download operation, the profile identifier identifies the service plan (e.g., the selected plan P1) selected by the user 108. By way of a non-limiting example, the profile identifier may be implemented as a number or text value. The request 210 may also identify the requested eSIM card operation, which in this example is the profile download operation.

The request 210 may be sent as an application programming interface ("API") request. The API request may be configured to communicate via a protocol, such as Simple Object Access Protocol ("SOAP"). By way of a non-limiting example, the API request may transmit the request as an HTTP request containing subscriber information. However, this is not a requirement. For example, REpresentational State Transfer ("REST") or Extensible Markup Language ("XML") data formatting may be used. Thus, the BSS web portal 136 may be configured to generate the web interface 200 displayed by the device 104, receive the communication 202 with the selection made by the user 108, and initiate the request 210 that informs the eSIM subscription manager 137 of the selection made by the user 108.

After the eSIM subscription manager 137 receives the request 210, the eSIM subscription manager 137 formulates a transmission 220 based on the request 210. In this example, referring to FIG. 2, the eSIM subscription manager 137 selects the operational profile 124 from the available operational profiles (e.g., the operational profiles 124-126 illustrated in FIG. 2) that are associated with the service plan (e.g., the selected plan P1 illustrated in FIGS. 2 and 3) identified by the profile identifier. For example, the eSIM subscription manager 137 may select the next available operational profile for the selected service plan (e.g., the service plan P1).

Then, the eSIM subscription manager 137 may instruct the eSIM communication server 138 to send the transmission 220 to the eSIM application 120 on the eSIM card 110. In this example, the eSIM subscription manager 137 may instruct the eSIM communication server 138 to transmit the selected operational profile 124 to the eSIM application 120 (e.g., over the first cellular data network 130). Optionally, the eSIM subscription manager 137 may send information 212 about the selected service plan to the eSIM communication server 138. Optionally, the eSIM subscription manager 137 may send the selected operational profile 124 to the eSIM communication server 138.

Next, the eSIM communication server 138 sends a transmission 220 to the eSIM application 120. In this example, the transmission 220 includes the selected operational profile 124. Depending on the implementation details, the operational profile 124 may include a new operational IMSI. After the eSIM application 120 receives the transmission 220, the eSIM application 120 configures the eSIM card 110 to operate with the operational profile 124 instead of the provisioning profile 122. For example, the eSIM application 120 may store and automatically activate the operational profile 124. In this manner, the device 104 is configured to communicate over the second cellular data network 131 immediately after the operational profile 124 has been activated by the eSIM application 120. Then, the device 104 searches for the second cellular data network 131. After locating the second cellular data network 131, the operational profile 124 attaches to the second cellular data network 131 in a manner substantially identical to the manner in which the provisioning profile 122 attached to the first cellular data network 130. At this point, the device 104 is able to communicate in accordance with the selected service plan without any further provisioning or other operations. For example, the device 104 may use the operational profile 124 to communicate with the Internet 132 over the second cellular data network 131 and receive the web interface 200. Additionally, as mentioned above, the device 104 may send the communication 202 to the BSS web portal 136.

As mentioned above, at any time, the user 108 may use the Internet browser 109 to navigate to the BSS web portal 136 over the second cellular data network 131 and the Internet 132. Then, the user 108 may use the web interface 200 to select a new service plan, which causes the web server 139 to send a request (like the request 210) to the eSIM subscription manager 137. Next, the eSIM subscription manager 137 selects a new operational profile and instructs the eSIM communication server 138 to download the new operational profile to the eSIM application 120. The eSIM application 120 receives the new operational profile from the eSIM communication server 138 and activates the new operational profile. Thus, the user 108 enjoys the flexibility of being able to change the MNO and/or service plan at any time through the BSS web portal 136.

In the example provided above, the communication 202 requests a profile download operation. On the other hand, referring to FIG. 1, the communication 202 may request an eSIM card operation other than the profile download operation. When this is the case, the communication 202 will identify the selected eSIM card operation and the eSIM card 110 and may include any information (e.g., parameters) needed to perform the selected eSIM card operation. Then, the BSS web portal 136 sends the request 210 to the eSIM subscription manager 137. In addition to the information identified above as being included in the request 210, the request 210 identifies the requested eSIM card operation and may include any information (e.g., parameters) needed to perform the selected eSIM card operation. The profile identifier in the request 210 may be empty or NULL if the profile identifier is not relevant to the requested eSIM card operation. Alternatively, the request 210 may omit the profile identifier if it is not relevant to the requested eSIM card operation.

After the eSIM subscription manager 137 receives the request 210, the eSIM subscription manager 137 formulates the transmission 220 based on the request 210. The transmission 220 may identify the requested eSIM card operation and the eSIM card 110. Additionally, the transmission 220 may include any information (e.g., parameters) needed to perform the requested eSIM card operation. For example, if the requested eSIM card operation is an applet timer value change, the transmission 220 includes details with respect to the eSIM card 110 (e.g., its identifier), as well as any relevant parameters, such as the new applet timer value. Such an operation may be used to set an amount of time between successive requests 442 as determined by a timer 444 (see FIGS. 5-7). By way of another non-limiting example, if the requested eSIM card operation is the removal of the operational profile 124, the transmission 220 includes details with respect to the eSIM card 110 (e.g., its identifier) and an identifier of the operational profile 124. By way of yet another non-limiting example, if the requested eSIM card operation is an application behavior change, the transmission 220 includes details with respect to the eSIM card 110 (e.g., its identifier), an identifier of the application, and any additional necessary information (e.g., parameters), such as new application code. Optionally, the eSIM subscription manager 137 may send information 212 about the selected eSIM card operation to the eSIM communication server 138, which may send the transmission 220 to the eSIM application 120.

Next, the eSIM application 120 implements the selected eSIM card operation in accordance with information received in the transmission 220. For example, if the requested eSIM card operation is an applet timer value change, the eSIM application 120 changes the applet timer value. By way of another non-limiting example, if the requested eSIM card operation is the removal of the operational profile 124, the eSIM application 120 removes the operational profile 124 identified in the transmission 220. By way of yet another non-limiting example, if the requested eSIM card operation is an application behavior change, the eSIM application 120 effectuates the change (e.g., stores and/or installs the new application code).

As mentioned above, the user 108 or the user 114 may use the computing device 112 to send the communication 202 to the BSS web portal 136. In such embodiments, the user 108 or the user 114 uses the Internet browser 119 to access the BSS web portal 136 directly using its Internet address. The BSS web portal 136 generates the web interface 200 and transmits it to the Internet browser 119, which displays the web interface 200 to the user 108 or the user 114. After the user 108 or the user 114 enters a selection of an eSIM card operation (e.g., a profile download operation) into the Internet browser 119, the Internet browser 119 sends the communication 202 to the BSS web portal 136. Next, the BSS web portal 136 sends the request 210 to the eSIM subscription manager 137. Thus, the BSS web portal 136 may be configured to generate the web interface 200 displayed by the computing device 112, receive the communication 202 with the selection made by the user 108 or the user 114, and initiate the request 210 that informs the eSIM subscription manager 137 of the selection made by the user 108 or the user 114. As described above, if the request 210 requests a profile download operation, the eSIM subscription manager 137 selects the operational profile 124 after the eSIM subscription manager 137 receives the request 210. From this point, one of the methods illustrated in FIGS. 4-7 and described below may be performed.

As mentioned above, the user 108 and/or the user 114 may use the device 104 and/or the computing device 112 to bypassing the BSS web portal 136 when performing an eSIM card operation. In such embodiments, the eSIM subscription manager 137 or the eSIM communication server 138 may be accessed directly using a command line interface or a separate web server (not shown). Instead of sending the communication 202 to the BSS web portal 136, the device 104 or the computing device 112 may be configured to send the request 210 directly to the eSIM subscription manager 137. As described above, if the request 210 requests a profile download operation, the eSIM subscription manager 137 selects the operational profile 124 after the eSIM subscription manager 137 receives the request 210. From this point, one of the methods illustrated in FIGS. 4-7 and described below may be performed.

FIGS. 4-7 illustrate alternate ways in which the eSIM platform 135 of the system 100 (see FIG. 1) may send the transmission 220 (e.g., including the selected operational profile 124 illustrated in FIG. 1) to the eSIM application 120 executing on the eSIM card 110. The eSIM card 110 may be implemented as an eUICC that stores an issuer security domain-root ("ISD-R") function 400. The ISD-R function 400 may be a component of the eSIM application 120 or may be accessible by the eSIM application 120. The eSIM subscription manager 137 may be implemented on the eSIM management platform 404 and may include a subscription manager-secure routing ("SM-SR") function 410 and subscription manager-data preparation ("SM-DP") function 412. Each action attributed to the SM-SR function 410 below may involve the eSIM subscription manager 137 instructing the eSIM communication server 138 (see FIG. 1) to perform all or a portion of the action. As explained above, the eSIM communication server 138 (see FIG. 1) is configured to communicate with the eSIM application 120 via SMS messages, HTTP messages, and the like. Additionally, at least some of the actions of the SM-SR function 410 may require the use of a specialized Hardware Security Module ("HSM") 414 that manages encryption keys and is used by the SM-SR function 410 to open an encrypted data channel 416 (e.g., encrypted using a first Secure Channel Protocol ("SCP"), such as SCP-81) with the eSIM card 110. The HSM 414 may be a component of the eSIM management platform 404, a component of the eSIM communication server 138 (see FIG. 1), or a separate device connected to the eSIM management platform 404 and/or the eSIM communication server 138.

Figure 4:
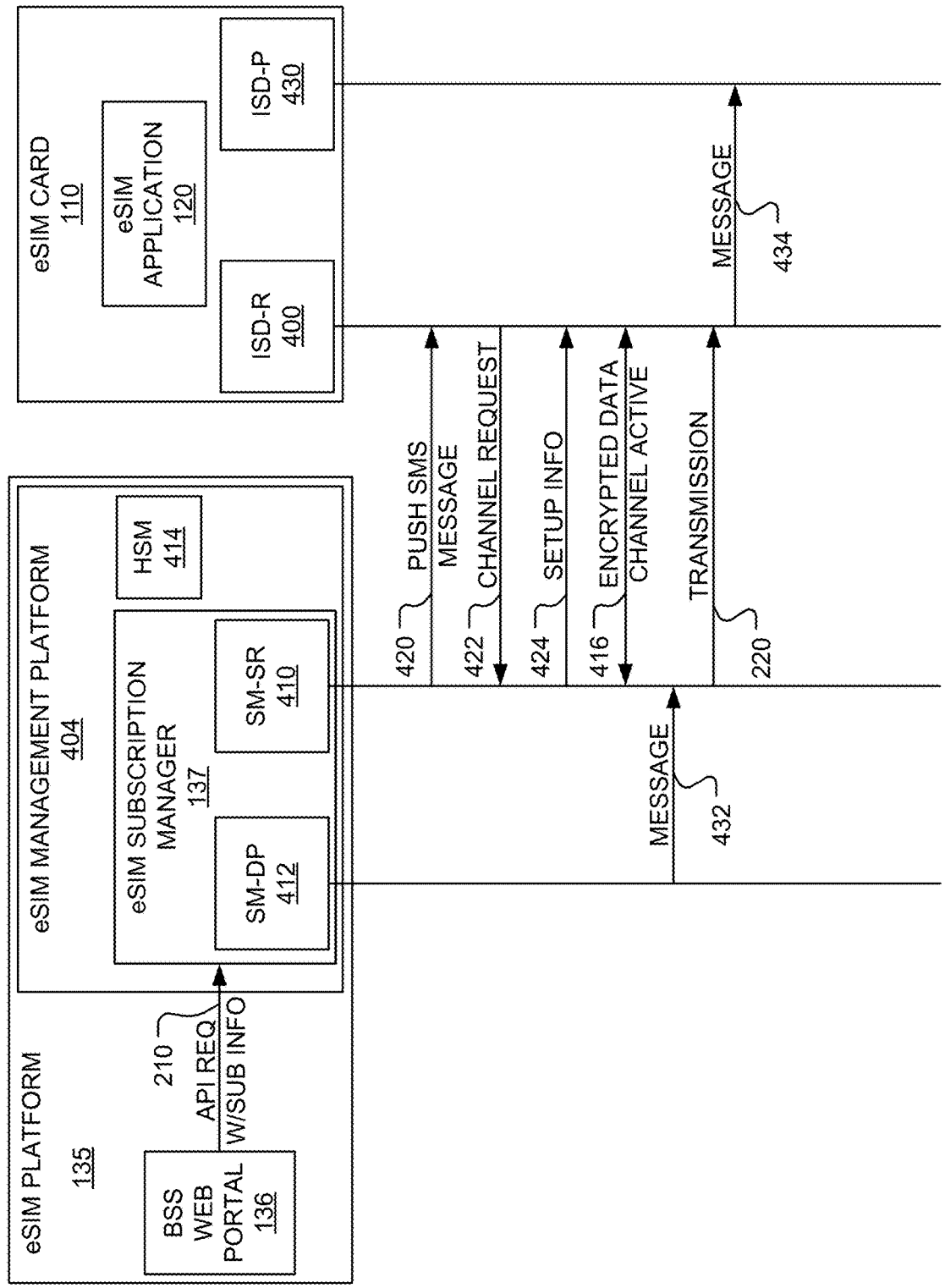
FIG. 4 is an illustration of a first standard data flow that may be used by the eSIM subscription manager with the assistance of Short Message Service ("SMS") to transmit a selected operational profile, or other selected eSIM card operation to the eSIM card.
Figure 5:
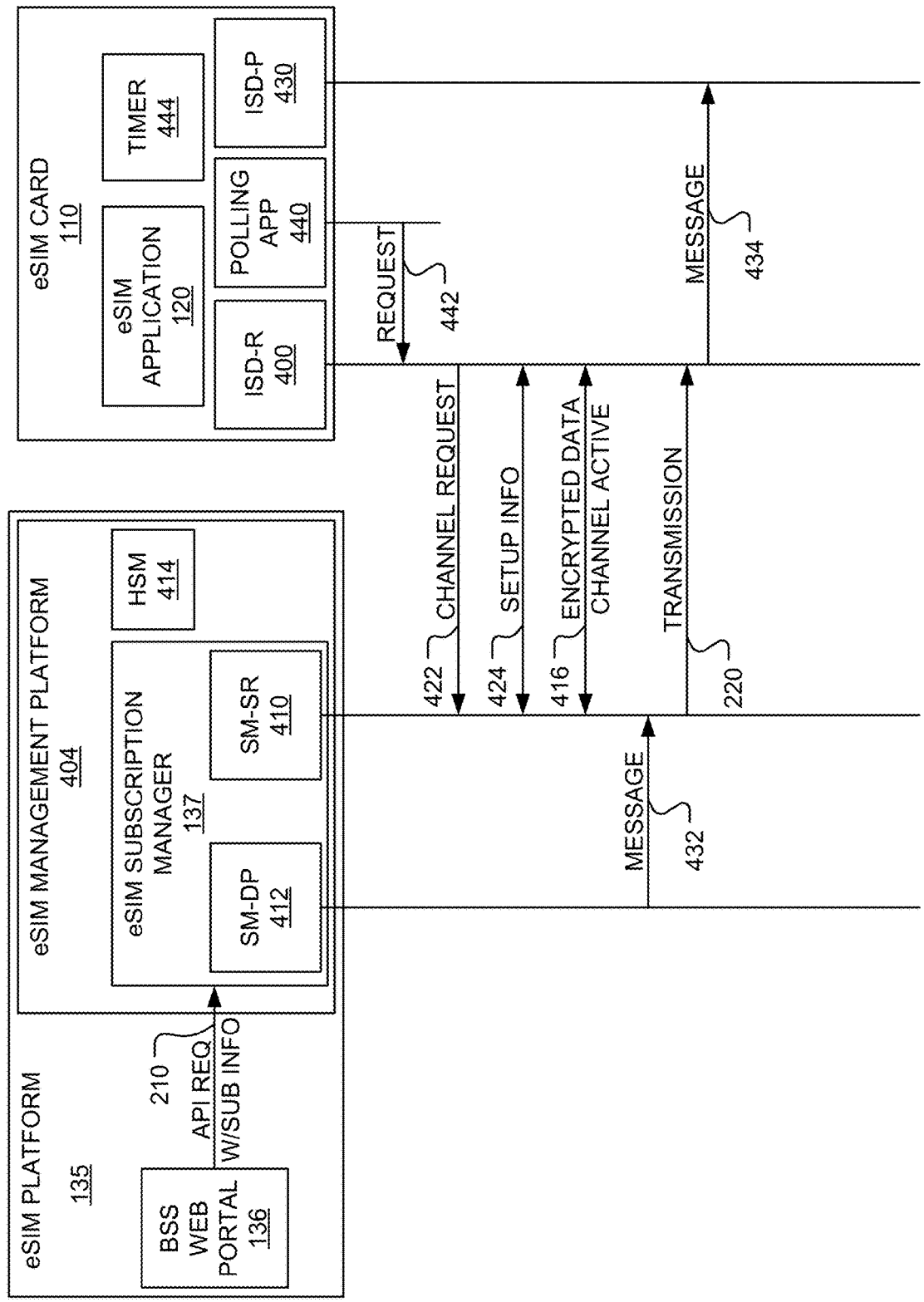
FIG. 5 is an illustration of a second standard data flow in which the eSIM card polls the eSIM subscription manager and requests the opening of an encrypted data channel with the eSIM subscription manager to transmit a selected operational profile, or the other selected eSIM card operation to the eSIM card.

Data flows illustrated FIGS. 4 and 5 may be characterized as being standard data flows. In the standard data flow illustrated in FIG. 4, after the eSIM subscription manager 137 receives the request 210, the SM-SR function 410 sends a push SMS message 420 (e.g., encrypted using a second SCP, such as SCP-80) to the ISD-R function 400. The ISD-R function 400 is configured to decrypt the push SMS message 420 after receiving it to remove the encryption (e.g., by the second SCP) applied by the SM-SR function 410. Then, the ISD-R function 400 responds to the SM-SR function 410 with a channel request 422. The channel request 422 requests the opening of the encrypted data channel 416 and may be an HTTP request sent using a Bearer Independent Protocol ("BIP"). The SM-SR function 410 exchanges setup information 424 with the ISD-R function 400. After channel setup is finished, the encrypted data channel 416 is active between the ISD-R function 400 and the SM-SR function 410. The encrypted data channel 416 may be encrypted using the first SCP (e.g., SCP-81).

The ISD-R function 400 creates an issuer security domain-profile ("ISD-P") 430 before or after the encrypted data channel 416 is active. The ISD-P 430 may be a component of the eSIM application 120 or may be accessible by the eSIM application 120.

Next, if the selected eSIM card operation is encrypted (e.g., a profile download operation), the SM-DP function 412 sends a message 432 (e.g., including the selected operational profile 124 illustrated in FIG. 1 or information about the selected eSIM card operation) to the SM-SR function 410. Then, the SM-SR function 410 sends the transmission 220 to the ISD-R function 400 over the encrypted data channel 416. On the other hand, if the selected eSIM card operation is not encrypted, the SM-DP function 412 may be skipped and the message 432 omitted. Instead, the SM-SR function 410 may send the transmission 220 (e.g., including the selected operational profile 124 illustrated in FIG. 1 or information about the selected eSIM card operation) to the ISD-R function 400 over the encrypted data channel 416. As mentioned above, the SM-SR function 410 may send the transmission 220 via the eSIM communication server 138 (see FIG. 1). Then, the ISD-R function 400 forwards a message 434 (e.g., including the selected operational profile 124 illustrated in FIG. 1 or information about the selected eSIM card operation) to the ISD-P 430.

If the selected eSIM card operation is encrypted, the SM-DP function 412 may encrypt (e.g., using a third SCP, such as SCP-03) the message 432 before sending it to the SM-SR function 410. The SM-SR function 410 may encrypt (e.g., using the first SCP, such as SCP-81) the transmission 220 before sending it to the ISD-R function 400 over the encrypted data channel 416. The ISD-R function 400 may decrypt the transmission 220 after receiving it to remove the encryption (e.g., by the first SCP) applied by the SM-SR function 410. If the selected eSIM card operation is encrypted, the ISD-P 430 may decrypt the message 434 after receiving it to remove the encryption (e.g., by the third SCP) applied by the SM-DP function 412.

At this point, if the transmission 220 includes the operational profile 124 (see FIG. 1) or the selected eSIM card operation indicates the operational profile 124 is to be used, the eSIM application 120 activates the operational profile 124 (e.g., marks the operational profile 124 as active within the eSIM card 110), which configures the eSIM card 110 to use the operational profile 124 to communicate over the second cellular data network 131 in accordance with a subscription type or service plan selected by the user 108. On the other hand, if the transmission 220 identifies an eSIM card operation other than the profile download operation, the eSIM application 120 implements the identified eSIM card operation in accordance with information received in the transmission 220.

Unlike the standard data flow of FIG. 4, the standard data flow of FIG. 5 uses polling and omits the push SMS message 420 (see FIG. 4). Referring to FIG. 5, in this standard data flow, the eSIM card 110 includes a polling application 440 that sends a request 442 to the ISD-R function 400. In response to the request 442, the ISD-R function 400 sends the channel request 422 to the SM-SR function 410. The remainder of the standard data flow is identical to the standard data flow of FIG. 4. Thus, the SM-SR function 410 exchanges the setup information 424 with the ISD-R function 400 and the encrypted data channel 416 is opened. Next, if the selected eSIM card operation is encrypted, the SM-DP function 412 sends the message 432 to the SM-SR function 410, and the SM-SR function 410 sends the transmission 220 to the ISD-R function 400 over the encrypted data channel 416. Alternatively, if the selected eSIM card operation is not encrypted, the SM-DP function 412 may be skipped and the message 432 omitted. Instead, the SM-SR function 410 may send the transmission 220 to the ISD-R function 400 over the encrypted data channel 416. Then, the ISD-R function 400 sends the message 434 (e.g., including the selected operational profile 124 illustrated in FIG. 1 or information about the selected eSIM card operation) to the ISD-P 430.

In FIG. 5, the eSIM subscription manager 137 waits for the channel request 422 before contacting the ISD-R function 400. Thus, the eSIM card 110 does not wait for the push SMS message 420 (see FIG. 4) before communicating with the eSIM management platform 404. Instead, the eSIM card 110 polls (by periodically sending the request 442 to) the eSIM subscription manager 137 for information, such as the selected operational profile 124 illustrated in FIG. 1 or a selected eSIM card operation. The request 442 may be sent periodically based on the timer 444 that is a component of the eSIM card 110. The data flow of FIG. 5 requires the opening of the encrypted data channel 416 (e.g., encrypted using by the first SCP, such as SCP-81) every time the request 442 is received by the ISD-R function 400. Opening the encrypted data channel 416 requires the HSM 414. Using the HSM 414 is very expensive, so, in this standard data flow, the polling application 440 may be limited to sending the channel request 422 once every month or once every other week.

Figure 6:
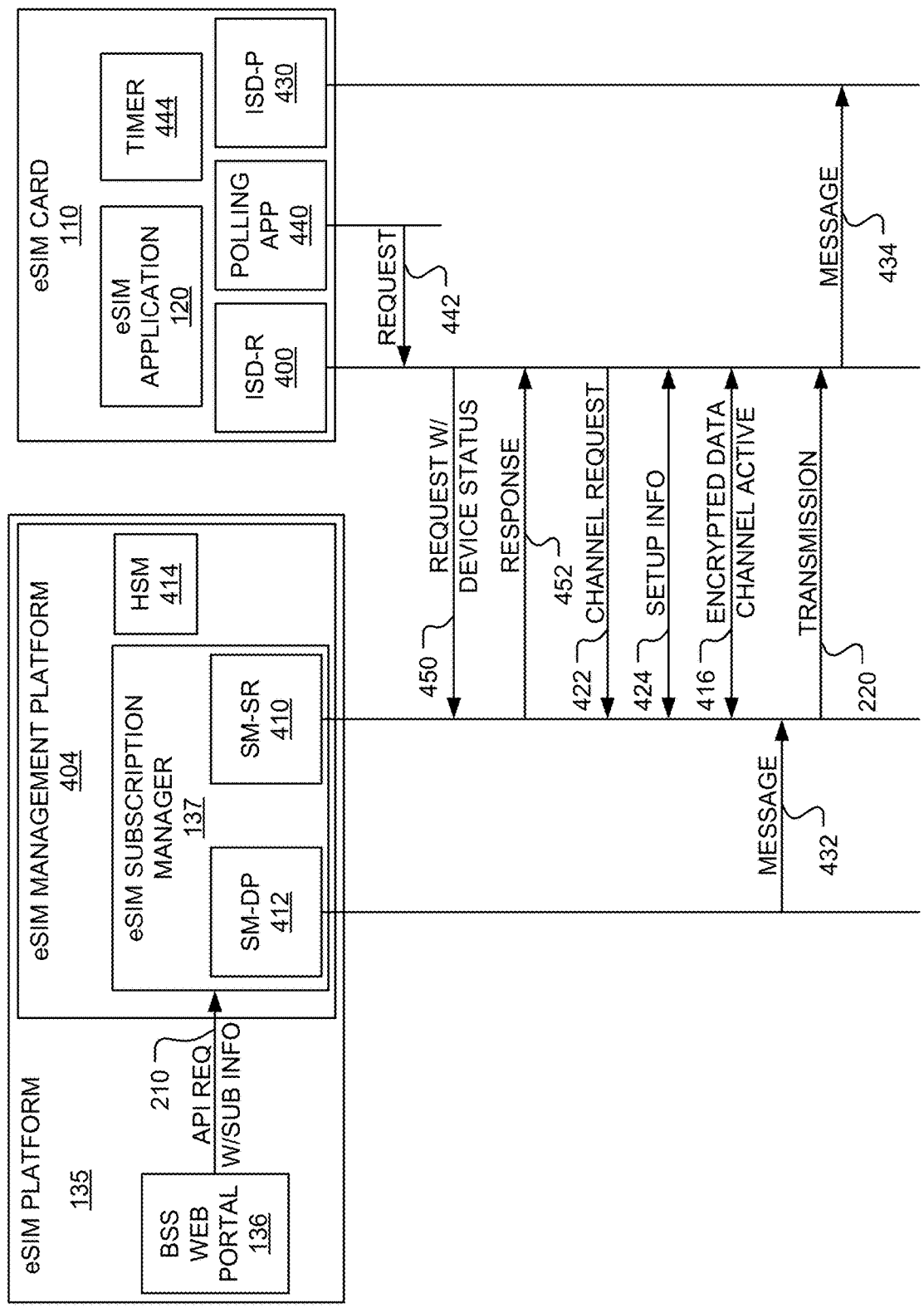
FIG. 6 is an illustration of a data flow in which the eSIM card polls the eSIM subscription manager and attempts to open a data channel only after the eSIM card receives a response from the eSIM subscription manager, and only if the eSIM subscription manager communicates that the data channel is required.

FIG. 6 illustrates an embodiment in which the eSIM subscription manager 137 has been modified to include an additional messaging layer of communication with the eSIM card 110. In this embodiment, in response to the request 442, the ISD-R function 400 sends a status request 450 (e.g., with device status) to the SM-SR function 410 (or other internal routing server), instead of the channel request 422. The status request 450 differs from the channel request 422 because the status request 450 is not a request to open the encrypted data channel 416. In essence the status request 450 may be viewed as being a query that asks whether the eSIM subscription manager 137 has information to download to the eSIM card 110.

The SM-SR function 410 responds to the status request 450 by sending a response 452 to the ISD-R function 400. The response 452 is positive when the eSIM subscription manager 137 has information (e.g., an eSIM card operation) to transmit to the eSIM card 110. A positive response indicates that an encrypted data channel is required. For example, the response 452 is positive when the eSIM subscription manager 137 has received the request 210 and needs to download to the selected operational profile 124 (see FIG. 1) to the eSIM card 110. Optionally, the response 452 may be negative when the eSIM subscription manager 137 does not have information (e.g., an eSIM card operation) to transmit to the eSIM card 110.

When the response 452 is positive, the ISD-R function 400 sends the channel request 422 to the SM-SR function 410. Thus, the ISD-R function 400 is configured to send the channel request 422 only when the response 452 received is positive. On the other hand, the ISD-R function 400 may ignore the response 452 when the response 452 is negative. This avoids opening an encrypted data channel every time the request 442 is received by the ISD-R function 400 and allows the eSIM card 110 to send the request 442 more frequently (e.g., about every minute). This way, the eSIM card 110 is always ready to receive a profile change or other eSIM card operation when that operation is triggered by the BSS web portal 136, the eSIM subscription manager 137 (e.g., a provisioning engine), and/or an application executing on the eSIM management platform 404.

The remainder of the data flow is identical to the standard data flows of FIGS. 4 and 5. Thus, referring to FIG. 6, after the SM-SR function 410 receives the channel request 422, the SM-SR function 410 exchanges the setup information 424 with the ISD-R function 400, and the encrypted data channel 416 is opened. Next, if the selected eSIM card operation is encrypted, the SM-DP function 412 sends the message 432 to the SM-SR function 410, and the SM-SR function 410 sends the transmission 220 to the ISD-R function 400 over the encrypted data channel 416. Alternatively, if the selected eSIM card operation is not encrypted, the SM-DP function 412 may be skipped and the message 432 omitted. Instead, the SM-SR function 410 may send the transmission 220 to the ISD-R function 400 over the encrypted data channel 416. Then, the ISD-R function 400 sends the message 434 to the ISD-P 430.

Figure 7:
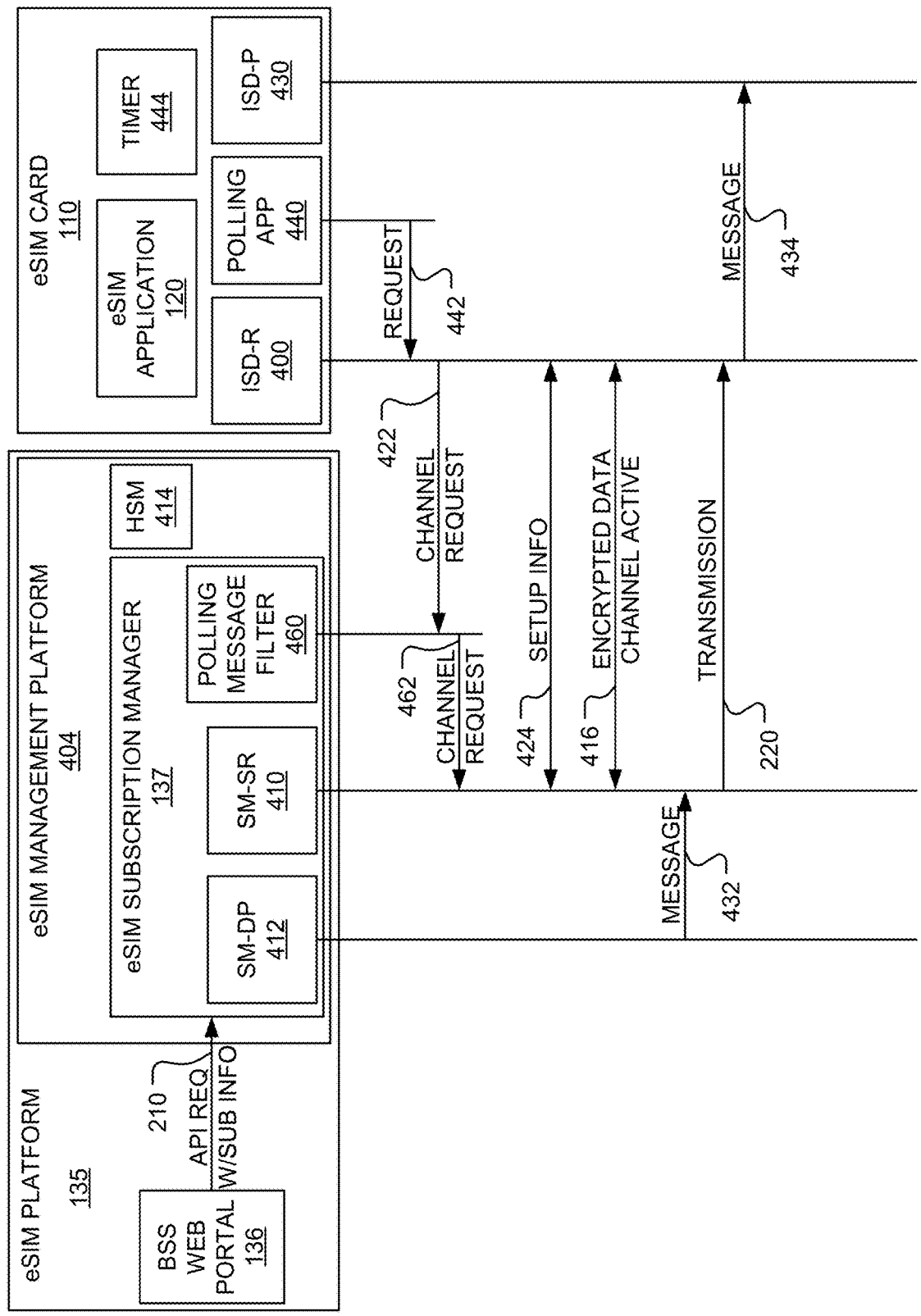
FIG. 7 is an illustration of a data flow in which the eSIM card polls the eSIM subscription manager and the eSIM subscription manager opens an encrypted data channel with the eSIM card only when the eSIM subscription manager has information to download to the eSIM card; otherwise, the eSIM subscription manager ignores the request.

FIG. 7 illustrates an embodiment in which the eSIM subscription manager 137 includes a polling message filter 460 configured to filter channel requests (e.g., the channel request 422) and to pass on a channel request (as a forwarded channel request 462) to the SM-SR function 410 only when the polling message filter 460 knows there is an eSIM card operation (e.g., a profile download operation) with information to download. Thus, the eSIM subscription manager 137 informs the polling message filter 460 that the eSIM subscription manager 137 has information (e.g., a profile change or information with respect to another eSIM card operation) that it needs to download to the eSIM card 110. In this embodiment, after receiving the request 442 from the polling application 440, the ISD-R function 400 sends the channel request 422 to the polling message filter 460. The polling message filter 460 sends the forwarded channel request 462 to the SM-SR function 410 (or other internal routing server) only when the polling message filter 460 knows there is information (e.g., a profile change or information with respect to another eSIM card operation) that it needs to download to the eSIM card 110. In other words, the eSIM subscription manager 137 ignores the channel request 422 when the polling message filter 460 determines that the eSIM subscription manager 137 does not have any information to download to the eSIM card 110.

When the SM-SR function 410 receives the channel request 462, the SM-SR function 410 exchanges the setup information 424 with the ISD-R function 400. The remainder of the data flow is identical to the standard data flows of FIGS. 4 and 5. Thus, referring to FIG. 7, after channel setup is finished, the encrypted data channel 416 is opened and active. Next, if the selected eSIM card operation is encrypted, the SM-DP function 412 sends the message 432 to the SM-SR function 410, and the SM-SR function 410 sends the transmission 220 to the ISD-R function 400 over the encrypted data channel 416. Alternatively, if the selected eSIM card operation is not encrypted, the SM-DP function 412 may be skipped and the message 432 omitted. Instead, the SM-SR function 410 may send the transmission 220 to the ISD-R function 400 over the encrypted data channel 416. Then, the ISD-R function 400 sends the message 434 to the ISD-P 430.

The embodiment of FIG. 7 avoids opening an encrypted data channel every time the channel request 422 is received by the eSIM subscription manager 137 and allows the eSIM card 110 to send the request 442 more frequently (e.g., about every minute). This way, the eSIM card 110 is always ready to receive a profile change or other eSIM card operation when that operation is triggered by the BSS web portal 136, the eSIM subscription manager 137 (e.g., a provisioning engine), and/or an application executing on the eSIM management platform 404.

The embodiments of FIGS. 6 and 7 may provide (without relying on SMS, or a large quantity of HSMs) more secure and more reliable communicating between the eSIM card 110 and the eSIM management platform 404 than the embodiment of FIGS. 4 and 5 for purposes of eSIM management.

Computing Device

FIG. 8 is a block diagram of hardware and an operating environment in conjunction with which implementations of the computing device 112 (see FIG. 1), the eSIM platform 135, the web server 139 (see FIG. 1), the eSIM subscription manager 137 (see FIG. 1), and the eSIM communication server 138 (see FIG. 1), the eSIM management platform 404 (see FIGS. 4-7), and the HSM 414 (see FIGS. 4-7) may be practiced. The description of FIG. 8 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including the mobile communication device 300 (see FIG. 9), hand-held devices, multiprocessor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network (e.g., the Internet 132). In a distributed computing environment, program modules may be located in both local and remote memory storage devices.

The exemplary hardware and operating environment of FIG. 8 includes a general-purpose computing device in the form of the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, a blade computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feedback game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 8 include a local-area network (LAN) 51 and a wide-area network (WAN) 52. Such networking environments are commonplace in offices, enterprise-wide computer networks, intranets and the Internet 132 (see FIG. 1).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the LAN 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions (e.g., for generating the web interface 200 illustrated in FIG. 3) that when executed by one or more processors cause the one or more processors to perform all or portions of the methods described above. The system memory 22 may also store data, such as the inventory 123 (see FIG. 2). Such instructions and/or data may be stored on one or more non-transitory computer-readable or processor readable media.

Mobile Communication Device

Figure 9:
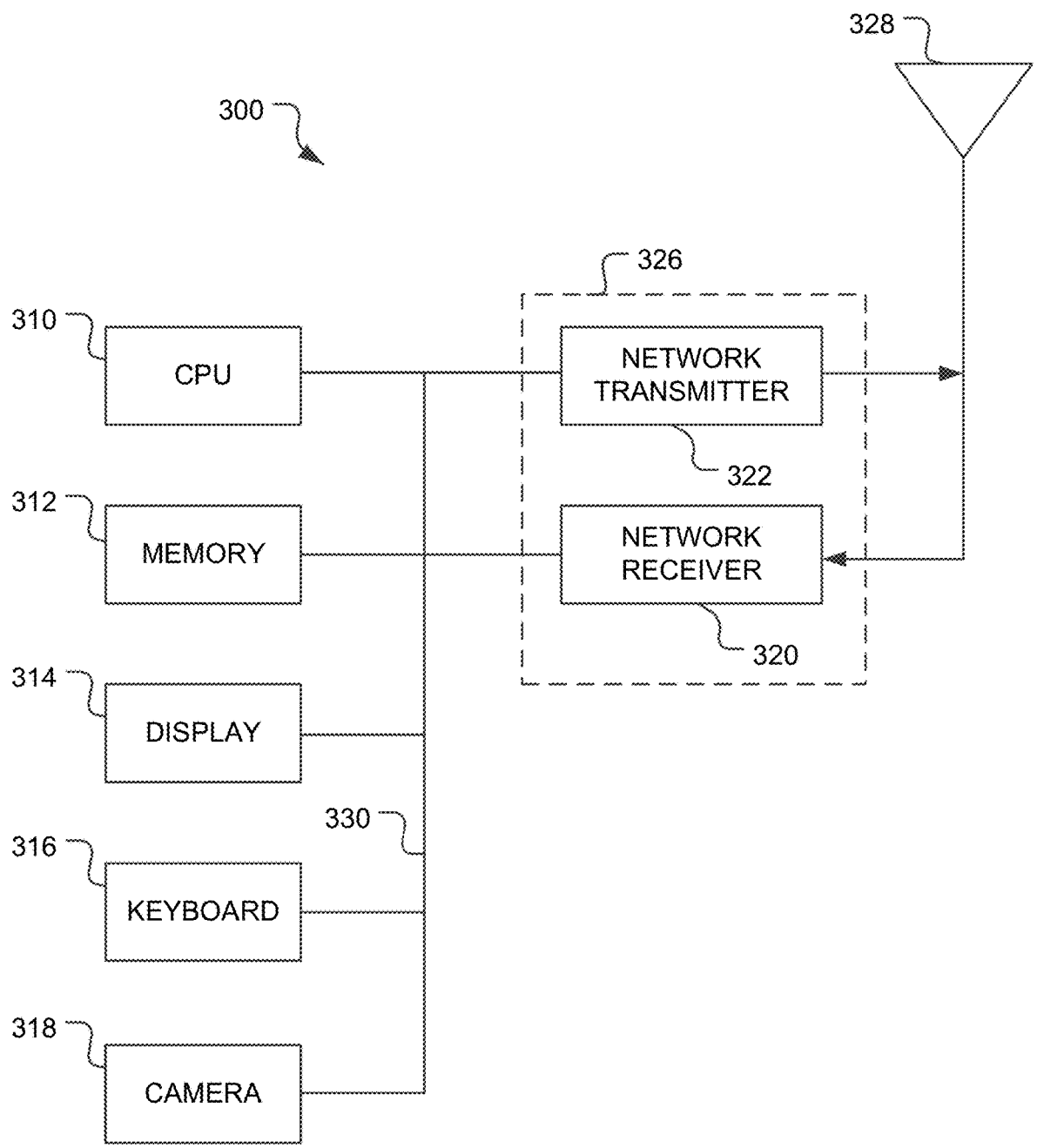
FIG. 9 is a functional block diagram illustrating an exemplary mobile communication device that may be used to implement each of the plurality of cellular enabled devices of FIG. 1.

FIG. 9 is a functional block diagram illustrating the mobile communication device 300 that may be used to implement one or more of the cellular enabled devices 102-106 (see FIG. 1) of the system 100 (see FIG. 1). The mobile communication device 300 may be implemented as a cellular telephone, smart phone, a tablet computing device, and the like. By way of a non-limiting example, the mobile communication device 300 may be implemented as a smartphone executing 105 or Android OS. By way of additional non-limiting examples, the mobile communication device 300 may be implemented as a device (e.g., a vehicle) configured for M2M communication and/or to communicate on the IoT.

The mobile communication device 300 includes the central processing unit ("CPU") 310. Those skilled in the art will appreciate that the CPU 310 may be implemented as a conventional microprocessor, application specific integrated circuit ("ASIC"), digital signal processor ("DSP"), programmable gate array ("PGA"), or the like. The mobile communication device 300 is not limited by the specific form of the CPU 310.

The mobile communication device 300 also contains the memory 312. The memory 312 may store instructions and data to control operation of the CPU 310. The memory 312 may include random access memory, ready-only memory, programmable memory, flash memory, and the like. The mobile communication device 300 is not limited by any specific form of hardware used to implement the memory 312. The memory 312 may also be integrally formed in whole or in part with the CPU 310.

The mobile communication device 300 also includes an eSIM card (not shown) like the eSIM card 110 (see FIG. 1). As mentioned above, the functionality of the eSIM card 110 described above may be integrated into silicon. For example, the eSIM card 110 may be implemented as an iSIM, a universal integrated circuit card ("UICC"), an embedded UICC ("eUICC"), a processor (e.g., a central processing unit 310), and/or memory (e.g., memory 312) of the device 104 (see FIG. 1).

The mobile communication device 300 also includes conventional components, such as a display 314, a keypad or keyboard 316, and a camera or video capture device 318. For example, the display 314 may be implemented as conventional touch screen display. These are conventional components that operate in a known manner and need not be described in greater detail. Other conventional components found in wireless communication devices, such as USB interface, Bluetooth interface, infrared device, and the like, may also be included in the mobile communication device 300. For the sake of clarity, these conventional elements are not illustrated in the functional block diagram of FIG. 9.

The display 314, the keyboard 316, and the camera or video capture device 318 are operable to receive user input and selections. Together the input and display devices may be described as providing a user interface. The user interface is configured to display the web interface 200 (see FIG. 3) described above and receive input (e.g., the selection of one of the service plans P1-P3 illustrated in FIG. 3) entered into or in response to the web interface 200.

The mobile communication device 300 also includes a network transmitter 322 such as may be used by the mobile communication device 300 for normal network wireless communication with a base station (not shown). FIG. 9 also illustrates a network receiver 320 that operates in conjunction with the network transmitter 322 to communicate with the base station (not shown). In a typical embodiment, the network transmitter 322 and network receiver 320 are implemented as a network transceiver 326. The network transceiver 326 is connected to an antenna 328. Operation of the network transceiver 326 and the antenna 328 for communication with a wireless network (not shown) is well-known in the art and need not be described in greater detail herein.

The mobile communication device 300 may also include a conventional geolocation module (not shown) operable to determine the current location of the mobile communication device 300.

The various components illustrated in FIG. 9 are coupled together by the bus system 330. The bus system 330 may include an address bus, data bus, power bus, control bus, and the like. For the sake of convenience, the various busses in FIG. 9 are illustrated as the bus system 330.

The memory 312 may store instructions (e.g., all or portions of the eSIM application 120 illustrated in FIG. 1) executable by the CPU 310. When executed by the CPU 310, the instructions may cause the CPU 310 to perform all or portions of the methods described above. The memory 312 (see FIG. 9) may also store data, such as the provisioning and operational profiles 122 and 124 (see FIG. 1). Such instructions and/or data may be stored on one or more non-transitory computer or processor readable media.

Alternatively, the eSIM card may include memory (not shown) that stores the instructions and/or data. The eSIM card may also include a processor (not shown) configured to execute the instructions. When executed by the processor, the instructions may cause the processor to perform all or portions of the methods described above. Such instructions and/or data may be stored on one or more non-transitory computer or processor readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. An embedded subscriber identity module ("eSIM") management platform for use with a mobile cellular device comprising an eSIM card, the mobile cellular device or the eSIM card comprising a timer, the eSIM management platform comprising at least one processor connected to memory storing instructions executable by the at least one processor, the instructions, when executed by the at least one processor, causing the at least one processor to:
   determine whether the memory comprises information to download to the eSIM card;
   receive a request from the eSIM card, the request having originated from the eSIM card and having been triggered by the timer;
   after receiving the request, open an encrypted data channel with the eSIM card when the eSIM management platform determines that the memory comprises information to download to the eSIM card; and
   download the information to the eSIM card over the encrypted data channel after the encrypted data channel has been opened.

2. The eSIM management platform of claim 1, wherein the instructions, when executed by the at least one processor, cause the at least one processor to:
   receive a selection of a service plan; and
   select an operational profile based on the selection, the information comprising the operational profile.

3. The eSIM management platform of claim 1, wherein the information identifies an eSIM card operation to be performed by the eSIM card after the information is downloaded.

4. The eSIM management platform of claim 1, wherein the instructions, when executed by the at least one processor, cause the at least one processor to wait to communicate with the eSIM card until after the eSIM management platform receives the request.

5. The eSIM management platform of claim 1, wherein the instructions, when executed by the at least one processor, cause the at least one processor to ignore the request when the eSIM management platform determines that the memory does not comprise information to download to the eSIM card.

6. An embedded subscriber identity module ("eSIM") management platform for use with a mobile cellular device comprising an eSIM card, the mobile cellular device or the eSIM card comprising a timer, the eSIM management platform comprising at least one processor connected to memory storing instructions executable by the at least one processor, the instructions, when executed by the at least one processor, causing the at least one processor to:
   determine whether the memory comprises information to download to the eSIM card;
   receive a first request from the eSIM card, the first request having originated from the eSIM card and having been triggered by the timer, the first request not requesting that the eSIM management platform open an encrypted data channel;
   after receiving the request, send a response to the eSIM card, the response being positive only when the eSIM management platform determines that the memory comprises information to download to the eSIM card;
   receive a second request from the eSIM card only when the response is positive, the second request requesting that the eSIM management platform open the encrypted data channel;
   open the encrypted data channel with the eSIM card after receiving the second request; and
   download the information to the eSIM card over the encrypted data channel after the encrypted data channel has been opened.

7. The eSIM management platform of claim 6, wherein the instructions, when executed by the at least one processor, cause the at least one processor to:
   receive a selection of a service plan; and
   select an operational profile based on the selection, the information comprising the operational profile.

8. The eSIM management platform of claim 6, wherein the information identifies an eSIM card operation to be performed by the eSIM card after the information is downloaded.

9. The eSIM management platform of claim 6, wherein the instructions, when executed by the at least one processor, cause the at least one processor to wait to communicate with the eSIM card until after the eSIM management platform receives the first request.

10. The eSIM management platform of claim 6, wherein the response is negative when the eSIM management platform determines that the memory does not comprise information to download to the eSIM card.

11. An embedded subscriber identity module ("eSIM") card configured to be installed in a mobile cellular device, the mobile cellular device or the eSIM card comprising a timer, the eSIM card comprising at least one processor connected to memory storing instructions executable by the at least one processor, the instructions, when executed by the at least one processor, causing the at least one processor to:
    send a first request to an eSIM management platform, the first request having been triggered by the timer, the first request not requesting that the eSIM management platform open an encrypted data channel, the eSIM management platform being configured to determine whether the eSIM management platform has information to download to the eSIM card;
    receive a response from the eSIM management platform, the response being positive only when the eSIM management platform determines that the eSIM management platform has information to download to the eSIM card;
    send a second request to the eSIM management platform only when the response is positive, the second request requesting that the eSIM management platform open the encrypted data channel;
    send a notification that the encrypted data channel is active after the encrypted data channel has been opened; and
    download the information from the eSIM management platform over the encrypted data channel after the encrypted data channel is opened.

12. The eSIM card of claim 11, wherein the response is negative when the eSIM management platform determines that the eSIM management platform does not have information to download to the eSIM card, and
    the instructions, when executed by the at least one processor, cause the at least one processor to ignore the first request when the response is negative.

13. The eSIM card of claim 11, wherein the information identifies an eSIM card operation, and
    the instructions, when executed by the at least one processor, cause the at least one processor to perform the eSIM card operation after the information is downloaded.

14. A computer-implemented method comprising:
    determining, by an embedded subscriber identity module ("eSIM") management platform, whether the eSIM management platform has information to download to an eSIM card installed in a mobile cellular device, the mobile cellular device or the eSIM card comprising a timer;
    receiving, by the eSIM management platform, a request from the eSIM card, the request having originated from the eSIM card and having been triggered by the timer;
    after receiving the request, opening, by the eSIM management platform, an encrypted data channel with the eSIM card only when the eSIM management platform determines that the eSIM management platform has information to download to the eSIM card; and
    downloading, by the eSIM management platform, the information to the eSIM card over the encrypted data channel after the encrypted data channel has been opened.

15. The computer-implemented method of claim 14, further comprising:
    receiving, by the eSIM management platform, a selection of a service plan; and
    selecting, by the eSIM management platform, an operational profile based on the selection, the information comprising the operational profile.

16. The computer-implemented method of claim 14, wherein the information identifies an eSIM card operation to be performed by the eSIM card after the information is downloaded.

17. The computer-implemented method of claim 14, wherein the eSIM management platform waits to communicate with the eSIM card until after the eSIM management platform receives the request.

18. The computer-implemented method of claim 14, wherein the eSIM management platform ignores the request when the eSIM management platform determines that the eSIM management platform does not have information to download to the eSIM card.

19. A computer-implemented method comprising:
    determining, by an embedded subscriber identity module ("eSIM") management platform, whether the eSIM management platform has information to download to an eSIM card installed in a mobile cellular device, the mobile cellular device or the eSIM card comprising a timer;
    receiving, by the eSIM management platform, a first request from the eSIM card, the first request having originated from the eSIM card and having been triggered by the timer, the first request not requesting that the eSIM management platform open an encrypted data channel;
    after receiving the first request, sending, by the eSIM management platform, a response to the eSIM card, the response being positive only when the eSIM management platform determines that the memory comprises information to download to the eSIM card;
    receiving, by the eSIM management platform, a second request from the eSIM card only when the response is positive, the second request requesting that the eSIM management platform open the encrypted data channel;
    opening, by the eSIM management platform, the encrypted data channel with the eSIM card after receiving the second request; and
    downloading, by the eSIM management platform, the information to the eSIM card over the encrypted data channel after the encrypted data channel has been opened.

20. The computer-implemented method of claim 19, further comprising:
    receiving, by the eSIM management platform, a selection of a service plan; and
    selecting, by the eSIM management platform, an operational profile based on the selection, the information comprising the operational profile.

21. The computer-implemented method of claim 19, wherein the information identifies an eSIM card operation to be performed by the eSIM card after the information is downloaded.

22. The computer-implemented method of claim 19, wherein the eSIM management platform waits to communicate with the eSIM card until after the eSIM management platform receives the first request.

23. The computer-implemented method of claim 19, wherein the response is negative when the eSIM management platform determines that the memory does not comprise information to download to the eSIM card.

* * * * *